Patented May 18, 1937

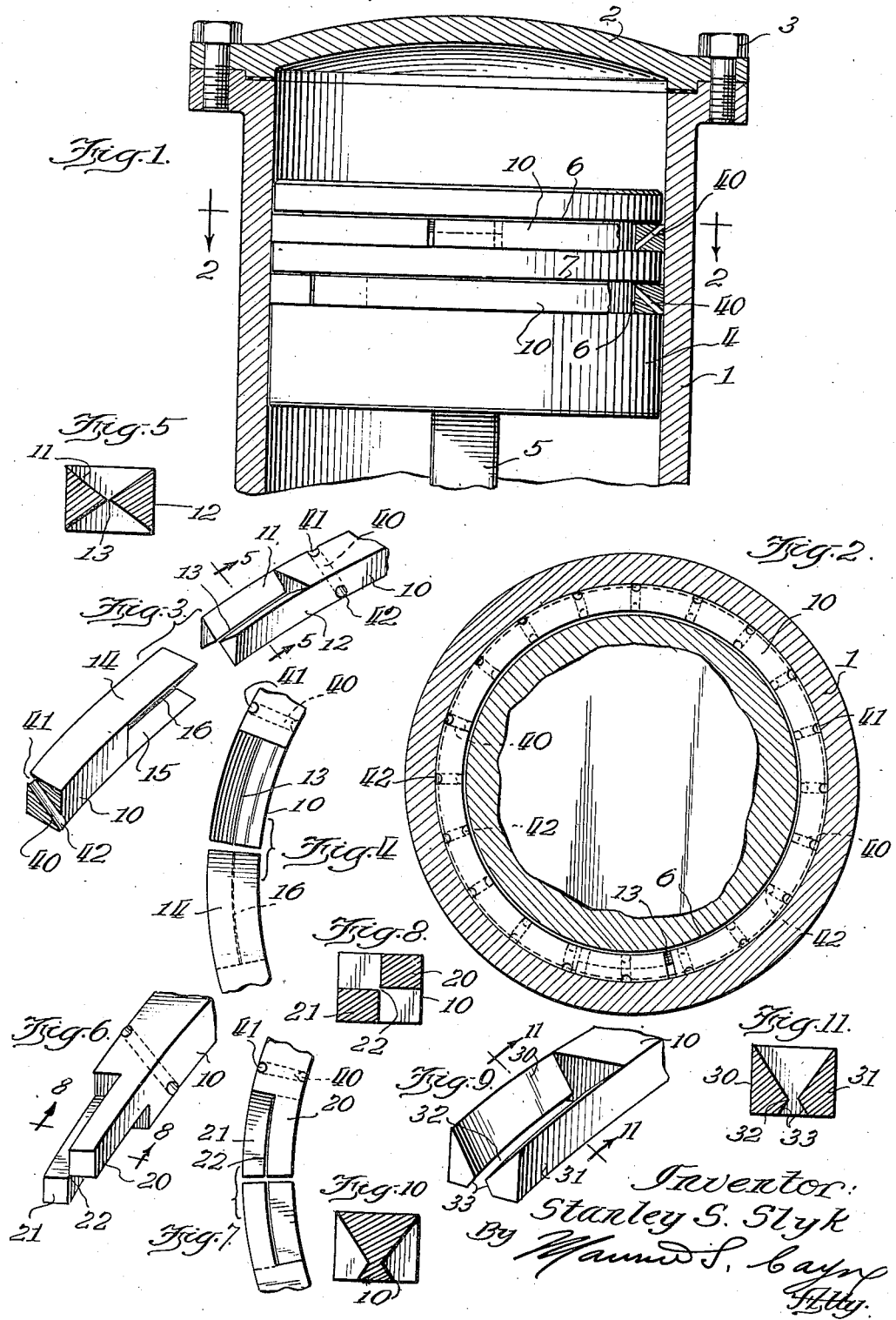

2,080,935

UNITED STATES PATENT OFFICE 2,080,935

PISTON RING

Stanley S. Slyk, Chicago, Ill.

Application May 13, 1935, Serial No. 21,205
Renewed April 15, 1937

1 Claim. (Cl. 309—46)

The invention relates to improvements in piston rings, and more particularly to a piston ring adapted for use in gasoline engines and the like.

It is an object of the invention to provide an improved piston ring having a novel and improved locking arrangement whereby the same will be highly effective for preventing leakage between the cylinder and the piston.

Another object of the invention is to provide in a piston ring of the character described novel and improved interlocking extensions which will produce a locking arrangement when the piston is in operative position for withholding compression.

A further object of the invention is the provision of a novel and improved piston ring having novel and improved means associated therewith for causing the same to expand when in operative position, thereby producing a close register of the ring with the cylinder wall and to remain in such condition at all times.

A still further object of the invention is the provision in a piston ring of the character described of novel and improved means for permitting the passage of fluid into the piston groove within which the ring is disposed for forcing the piston ring outwardly against the cylinder wall.

A still further object of the invention is to provide in a piston ring of the character described, a plurality of circumferentially arranged spaced inclined passages extending from a point adjacent the upper edge of the outer wall of the piston ring to a point adjacent the lower edge of the inner wall thereof, whereby fluid may be admitted to the piston groove in back of the piston ring to force the same outwardly, said groove also materially increasing the flexibility and resiliency of the piston ring.

A still further object of this invention is to provide a piston ring of the character described which will be simple in construction, which may be produced along lines convenient for low cost manufacture, and which will be highly efficient for carrying out the purposes for which it is designed.

With the foregoing and other objects in view which will appear as the description proceeds, the invention consists in certain novel features of construction, arrangement and combination of parts hereinafter fully described, illustrated in the accompanying drawing, and particularly pointed out in the appended claim, it being understood that various changes in the form, proportion, size and minor details of the structure may be made without departing from the spirit or sacrificing any of the advantages of the invention.

For the purpose of facilitating an understanding of my invention, I have illustrated in the accompanying drawing, several embodiments thereof, from an inspection of which when considered in connection with the following description, my invention, its mode of construction, assembly and operation, and many of its advantages should be readily understood and appreciated.

Referring to the drawing in which the same characters of reference are employed to indicate corresponding or similar parts throughout the several figures of the drawing:

Figure 1 is a sectional view through a cylinder showing a piston having rings embodying my invention associated therewith;

Fig. 2 is a transverse sectional view taken substantially on line 2—2 of Fig. 1;

Fig. 3 is a view in perspective showing the cuts produced at the free ends of the ring for forming the interlocking joint for the same;

Fig. 4 is a top plan view of the portion of the ring shown in Fig. 3;

Fig. 5 is a sectional view taken substantially on line 5—5 of Fig. 3;

Fig. 6 is a view, similar to Fig. 3, of a modified form of cut provided for the ends of the ring to form the interlocking joint, showing only one end thereof;

Fig. 7 is a top plan view of the modified form shown in Fig. 6;

Fig. 8 is a cross sectional view taken substantially on line 8—8 of Fig. 6;

Fig. 9 is a view in perspective similar to Fig. 3, showing a still further modified form;

Fig. 10 is a sectional view of the male end of the interlocking joint provided for the form shown in Fig. 9; and Fig. 11 is a sectional view taken substantially on line 11—11 of Fig. 9.

Referring to the drawing more specifically by characters of reference, the numeral 1 designates a cylinder having a cylinder head 2 detachably secured thereto by means of the bolts 3. Disposed within the cylinder is a piston 4 having a piston rod 5 connected thereto, said piston being provided with the piston grooves 6 and 7. As the structure so far described forms no part of the present invention, it is not believed necessary to describe the same in more detail.

Adapted for disposition within the piston grooves 6 and 7 are my improved piston rings, generally designated by the reference character 10, which rings are adapted for forming a tight seal whereby leakage between the cylinder and the piston is practically eliminated.

One of the free ends of the ring shown in Figs. 3, 4 and 5 are cut so as to form a pair of prongs 11 and 12, said prongs being substantially triangular in cross section and have their inner ends spaced from each other a very minute distance so as to form a fine gap 13. This end of said ring is provided with the prongs arranged in such a manner that the vertical front and rear walls of the ring form the sides of the triangle remote from the apex thereof. This is the right hand end, as viewed in Fig. 3.

The other end of said ring is provided with similarly shaped prongs 14 and 15 also of substantially triangular formation in cross section and being spaced from each other by the gap 16. The prongs 14 and 15 are arranged so that the sides of the triangle remote from the apex thereof are formed by the top and bottom walls of the ring. In other words, the two ends of the ring are cut so that when the same are brought into interlocking engagement with each other it will in effect form a substantially solid ring of rectangular cross section. By reason of this arrangement it will be apparent that the wearing of the ring, particularly at the joint thereof, will not in any way effect the seal produced at the joint, thereby preventing leakage as is the case with piston rings now on the market.

In the embodiment shown in Figs. 6, 7 and 8, the construction of the interlocking ends of the ring are substantially the same as those hereinbefore described in connection with the first modification with the exception that the cross sectional formation of the prongs 20 and 21 are substantially square instead of triangular, the adjacent edges of said prongs being spaced a very small distance from each other to provide a gap 22 to permit the interlocking engagement of the two free ends of the ring, and when brought into such engagement, the joint will form in effect a complete and solid ring of substantially rectangular cross section. In this form, as well as in the previous one already described, when in operative position the free ends of the joint will be prevented from relative vertical or lateral movement, thereby effectively producing a seal tight joint at all times, and thereby eliminating the possibility of leakage as is the case with the overlapping joints heretofore produced in piston rigs of this character.

A still further improved form of interlocking joint for the free ends of the ring is shown in Figs. 9, 10 and 11. In this form, the female portion of the joint, more particularly illustrated in Fig. 9, is provided with a pair of extensions 30 and 31 spaced from each other at their adjacent edges by the gap 32, adjacent which gap the said extensions are undercut, as shown at 33, to produce a cross sectional formation substantially as shown in Fig. 9.

The male portion of the interlocking joint, a cross sectional view of which is shown in Fig. 10, is adapted to be received in interlocking engagement with the female portion, and when in such engagement will in effect form a complete and substantially solid ring at the joint of substantially rectangular cross section. In this form, just as in the forms already referred to, the locking arrangement for the ends of the ring when the same is in operative position will prevent relative vertical and lateral movement of the free ends of the ring thereby producing a tight seal between the piston and the cylinder, and by virtue of the specific construction of locking arrangement in all of the modifications it will be apparent that no matter how thin the ring is worn, the same will present in effect a solid continuous outer cylindrical face to the cylinder wall and leave no gap which may permit leakage past the same or which may result in injury to the cylinder wall.

A further feature of my invention resides in the provision of the novel means for permitting the passage of fluid to the piston groove within which the piston ring is located, whereby said fluid will force itself under the ring to force the same outwardly into tighter sealing engagement with the cylinder wall. Thus in the embodiments illustrated, I provide in the body of the ring a plurality of circumferentially spaced passages 40, said passages extending from one outside corner of the ring, as shown at 41, to the corner disposed diagonally opposite thereto, as shown at 42. The provision of these passages will permit the entry of fluid into the piston groove directly in back of the piston and thereby force the same outwardly towards the cylinder wall. The number of passages provided will depend entirely upon the compression desired, and this number may be reduced or increased to control said compression.

A further feature of the provision of these inclined passages is that a greater flexibility or resiliency is imparted to the ring by reason of the presence of these passages, while at the same time it does not in any way effect the durability or strength of the piston ring proper. It will also be noted that by arranging the piston rings in the grooves 6 and 7 so that one will have its passages opening at the upper outside corner and the other will have its passages opening at the lower outside corner, the said rings will be effective in accomplishing the results for which they have been designed when the piston is moving in either direction.

From the above it will be apparent that I have produced a piston ring which in operative condition will have the free ends thereof not only overlapped, but interlocked, and also one in which the compression from the combustion chamber may enter into the piston groove within which the ring is located to act upon the back of the ring to force the same outwardly and thereby ensure the maintenance of the outer surface of said rings in close register with the cylinder wall.

It is believed that my invention, its mode of construction and assembly, and many of its advantages should be readily understood from the foregoing without further description, and it should also be manifest that while preferred embodiments of the invention have been shown and described for illustrative purposes, the structural details are nevertheless capable of wide variation within the purview of my invention as defined in the appended claim.

What I claim and desire to secure by Letters Patent of the United States is:

A piston ring for use in a piston provided with a ring receiving groove, said ring being of substantially rectangular cross section and having opposing ends, a pair of extensions provided on one end of said ring, said extensions being of substantially triangular cross section with the side opposite the apex of the triangle extending across the full side surface of the ring, the opposite end of said ring being provided with similar and complemental extensions, whereby the extensions on the ends of the ring will interfit when the ring is in use and will be of substantially rectangular cross section.

STANLEY S. SLYK.